(12) United States Patent
Satou

(10) Patent No.: US 9,434,070 B2
(45) Date of Patent: Sep. 6, 2016

(54) APPARATUS AND METHOD FOR PICKING UP ARTICLE RANDOMLY PILED USING ROBOT

(71) Applicant: FANUC Corporation, Yamanashi (JP)

(72) Inventor: Taiga Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 14/532,710

(22) Filed: Nov. 4, 2014

(65) Prior Publication Data
US 2015/0127161 A1 May 7, 2015

(30) Foreign Application Priority Data

Nov. 5, 2013 (JP) .................. 2013-229616

(51) Int. Cl.
*B25J 9/16* (2006.01)
*B25J 19/02* (2006.01)
*B65G 47/90* (2006.01)

(52) U.S. Cl.
CPC ............. *B25J 9/1612* (2013.01); *B25J 9/1697* (2013.01); *B65G 47/905* (2013.01); *G05B 2219/40053* (2013.01); *G05B 2219/40564* (2013.01); *G05B 2219/40609* (2013.01); *G06T 2207/10028* (2013.01)

(58) Field of Classification Search
CPC .... B25J 9/1694; B25J 9/1697; B25J 19/021; B25J 19/022; B25J 19/023; B65G 47/905; B23P 19/007; G05B 2219/40053; G05B 2219/40564; G06T 7/004; G06T 7/0042; G06T 7/0048; G06T 7/0057; G06T 7/60; G06T 7/606; G06T 2207/30164; G06T 2207/10028; G06T 1/0014
See application file for complete search history.

(56) References Cited

FOREIGN PATENT DOCUMENTS

| | | |
|---|---|---|
| AT | 508465 A2 | 1/2011 |
| CN | 1162681 C | 8/2004 |
| CN | 101618544 B | 8/2011 |
| CN | 102472612 A | 5/2012 |
| CN | 103085076 A | 5/2013 |
| JP | 2002-046865 A | 2/2002 |
| JP | 2011-179909 A | 9/2011 |
| JP | 2012-183593 A | 9/2012 |

*Primary Examiner* — Spencer Patton
(74) *Attorney, Agent, or Firm* — Hauptman Ham, LLP

(57) ABSTRACT

An article pickup apparatus configured so as to measure surface positions of articles by a three-dimensional measurement instrument to acquire position information of three-dimensional points, calculate a density distribution indicating a degree of a distribution of the three-dimensional points in a three-dimensional space based on the measured position information, calculate a density local maximum position where a density is locally maximized based on the density distribution, calculate a hand position posture which is a position and a posture of the hand capable of picking up an article at the density local maximum position based on the density local maximum position calculated, and control the robot so as to move the hand to the hand position posture to pick up the article.

6 Claims, 10 Drawing Sheets

APPARATUS AND METHOD FOR PICKING UP ARTICLE RANDOMLY PILED USING ROBOT

RELATED APPLICATIONS

The present application claims priority to Japanese Application Number 2013-229616, filed Nov. 5, 2013, the disclosure of which is hereby incorporated by reference herein in its entirety.

BACKGROUND OF THE INVENTION

1. Field of the Invention

The present invention relates to an article pickup apparatus and an article pickup method for recognizing a position and a posture of an article randomly piled in a three-dimensional space and picking up the recognized article using a robot.

2. Description of the Related Art

As an apparatus of this type, there is known an apparatus configured to recognize a position of an article by applying pattern matching to a two-dimensional image obtained by imaging articles randomly piled using a camera or a three-dimensional point set obtained by measurement using a three-dimensional measurement instrument. This apparatus is described, for example, in Japanese Laid-open Patent Publication No. 2011-179909 (JP2011-179909A).

In the apparatus described in JP2011-179909A1, while a three-dimensional model pattern of an article is previously acquired from a CAD model or the like, surfaces of articles in a three-dimensional space are measured using a three-dimensional measurement instrument and a three-dimensional point set (a distance image) is acquired, and then the three-dimensional point set is divided into partial regions surrounded by an edge extracted from the three-dimensional point set. Then, initially, one of the partial regions is set as an article region, and both matching processing of the three-dimensional model pattern for the article region and update processing for adding another partial region to the article region are repeated to measure positions and postures of the articles.

However, in the apparatus described in JP2011-179909A, it is necessary to previously prepare a three-dimensional model pattern for each type of article, and therefore, time and effort are needed. In particular, regarding a large number of types of articles, it is necessary to prepare model patterns for the number of types and therefore, much time and effort are needed. Further, for an indefinitely shaped article, it is inherently difficult to prepare a model pattern, resulting in difficulty in an application thereof. Further, while articles are randomly piled, it is difficult to obtain three-dimensional point sets sufficient to the extent that a three-dimensional posture of an article can be determined via pattern matching.

SUMMARY OF THE INVENTION

An article pickup apparatus according to an aspect of the present invention includes: a robot including a hand capable of holding an article; a three-dimensional measurement instrument measuring surface positions of a plurality of articles randomly piled on a three-dimensional space to acquire position information of a plurality of three-dimensional points on surfaces of the articles; a density calculation unit calculating a density distribution indicating a degree of a distribution of the plurality of three-dimensional points in the three-dimensional space, based on the position information measured by the three-dimensional measurement instrument; a local maximum position calculation unit calculating a density local maximum position where a density is locally maximized, based on the density distribution calculated by the density calculation unit; a hand position posture calculation unit calculating a hand position posture based on the density local maximum position calculated by the maximum position calculation unit, the hand position posture being a position and a posture of the hand capable of picking up an article at the density local maximum position or in the vicinity of the density local maximum position; and a robot control unit controlling the robot so as to move the hand to the hand position posture calculated by the hand position posture calculation unit to pick up the article.

Another aspect of the present invention is an article pickup method for picking up a plurality of articles randomly piled on a three-dimensional space using a robot including a hand capable of holding an article, the method including: measuring surface positions of the plurality of articles randomly piled by a three-dimensional measurement instrument to acquire position information of a plurality of three-dimensional points on surfaces of the articles; calculating a density distribution indicating a degree of a distribution of the plurality of three-dimensional points in the three-dimensional space, based on the position information measured by the three-dimensional measurement instrument; calculating a density local maximum position where a density is locally maximized, based on the density distribution calculated; calculating a hand position posture based on the density local maximum position calculated, the hand position posture being a position and a posture of the hand capable of picking up an article at the density local maximum position or in the vicinity of the density local maximum position; and controlling the robot so as to move the hand to the hand position posture calculated to pick up the article.

BRIEF DESCRIPTION OF THE DRAWINGS

Objects, features, and advantages of the present invention will be apparent based on the following description of an embodiment when taken with the accompanying drawings in which.

DETAILED DESCRIPTION

Figure 1:
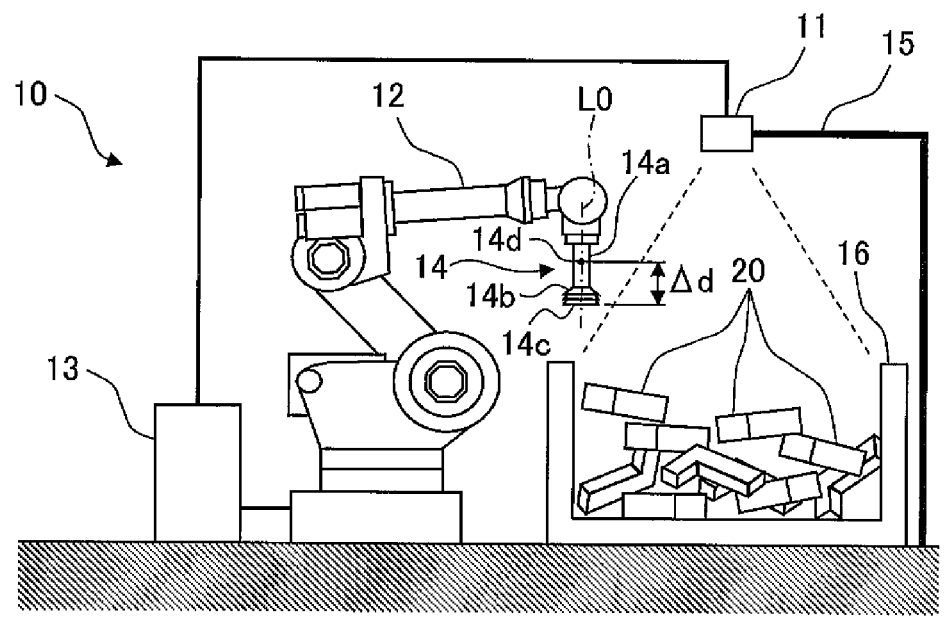
FIG. 1 is a view illustrating a schematic configuration of an article pickup apparatus according to one embodiment of the present invention.

Hereinafter, with reference to FIG. 1 to FIG. 15, an article pickup apparatus according to the embodiment of the present invention will be described. FIG. 1 is a view illustrating a schematic configuration of an article pickup apparatus 10 according to one embodiment of the present invention. The article pickup apparatus 10 includes a three-dimensional measurement instrument 11, a robot 12, and a robot control device 13 for controlling the robot 12 by being connected to the three-dimensional measurement instrument 11 and the robot 12. The robot 12 includes a hand 14 mounted on a tip of an arm 12a. A container 16 is disposed sideward of the robot 12. FIG. 1 also illustrates an orthogonal three-axis coordinate system of X, Y, and Z. The Z-direction is a vertical direction, and the X-direction and the Y-direction are horizontal directions. The container 16 is illustrated on an XZ plane.

In the container 16 opened upward, a plurality of articles 20 are randomly piled. The article pickup apparatus 10 of the present embodiment recognizes a position and a posture of an article 20 to be picked up while the plurality of articles 20 are randomly piled, picks up and holds the recognized article 20 from the container 16 using the hand 14, and conveys the held article 20 to a predetermined position outside the container 16 by an operation of the robot 12. FIG. 1 illustrates the plurality of articles 20 as the same shape (L-letter shape) as each other but any shape other than the L-letter shape is employable. Indefinitely shaped articles and a plurality of types of articles may also be included. In the following description, in some cases, the article 20 held by the hand 14 is expressed using a sign 21 (refer to FIG. 13) for discrimination from other articles in the container 16.

The three-dimensional measurement instrument 11 is disposed above a center portion of the container 16 and measures a surface of an exposed article 20 among articles 20 randomly piled in the container 16 to acquire position information (three-dimensional information) of a plurality of three-dimensional points. A measurement range of the three-dimensional measurement instrument 11 needs to include the container 16 but an excessively large measurement range causes to decrease measurement resolution. Therefore, preferably, the measurement range is equivalent to an occupied range of the container 16 and, for example, accords with the occupied range of the container 16. In FIG. 1, the three-dimensional measurement instrument 11 is fixed to a dedicated cradle 15 but may be mounted on a tip of the robot 12. The three-dimensional measurement instrument 11 and the robot control device 13 are connected to each other via a communication unit such as a communication cable so as to be communicable with each other.

As the three-dimensional measurement instrument 11, various non-contact types are usable. There are for example, a stereoscopic type using two cameras, a scanning type using laser slit light, a scanning type using laser spot light, a type of projecting pattern light on an article using a device such as a projector, and a type of utilizing a flight time from emission of light from a projector to incidence to a light receiver via reflection on an article surface.

The three-dimensional measurement instrument 11 expresses the acquired three-dimensional information as the format of a distance image or a three-dimensional map. The distance image is an image where three-dimensional information is expressed as an image format, and expresses a height of a position on an image or a distance from the three-dimensional measurement instrument 11 using brightness or a color of each pixel of the image. On the other hand, the three-dimensional map is a map where three-dimensional information is expressed as a set of measured three-dimensional coordinate values (x, y, z). In the present embodiment, each pixel in a distance image or a point having three-dimensional coordinate values in a three-dimensional map is referred to as a three-dimensional point, and a set including a plurality of three-dimensional points is referred to as a three-dimensional point set. The three-dimensional point set is a set of all the three-dimensional points measured using the three-dimensional measurement instrument 11 and can be acquired using the three-dimensional measurement instrument 11.

In the present embodiment, the three-dimensional measurement instrument 11 measures a three-dimensional position of a surface of an exposed article 20 and detects a position posture on the surface of the article 20. The hand 14 makes contact with the surface of the article 20 having the detected position posture and holds the article 20. The hand 14 of such a type includes, for example, an attracting pad, a suction nozzle, and an attracting magnet. In the present embodiment, an attracting pad is used as the hand 14.

An attracting pad 14 includes a shaft unit 14a extending in a longitudinal direction and a pad unit 14b disposed on a tip of the shaft unit 14a. A lower end portion of the pad unit 14b includes an attracting face 14c, and the center of the attracting face 14c is located on an axis line L0 passing through the center of the shaft unit 14a. In a position on the axis line L0 upward from the center of the attracting face 14c by a predetermined distance Δd, a reference point 14d of the hand 14 is set. A position posture of the hand 14 is controlled by an operation of the robot 12. In other words, a position of the reference point 14d in a three-dimensional space and a direction of the axis line L0 are controlled. In the present embodiment, the hand 14 is configured to hold one article 20, but the hand 14 may be configured to hold a plurality of articles at the same time.

Figure 2:
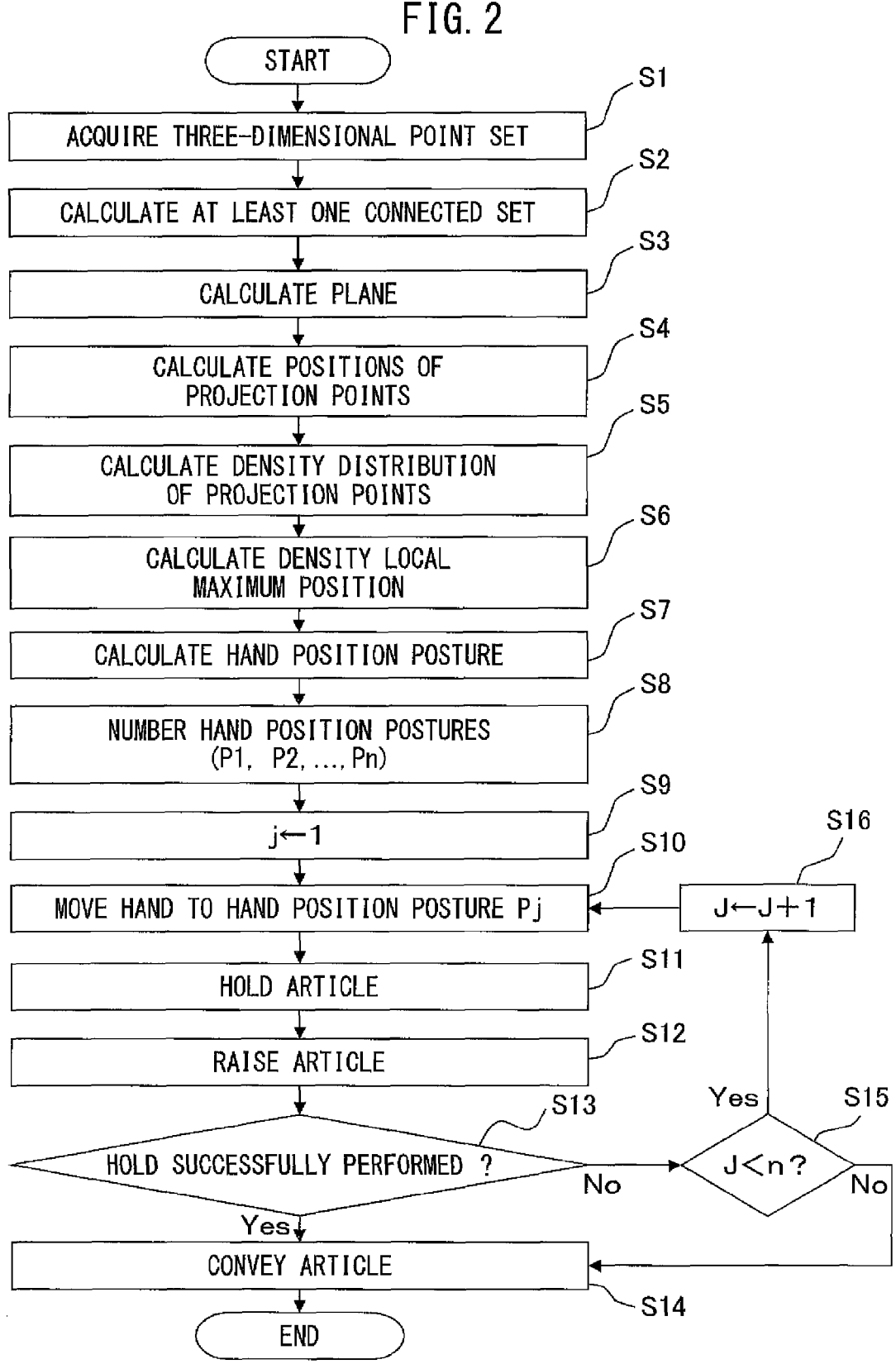
FIG. 2 is a flowchart illustrating one example of processing executed in a robot control device of FIG. 1.

FIG. 2 is a flowchart illustrating processing executed in the robot control device 13 and specifically one example of processing for article pickup. An operation of the article pickup apparatus 10 will be described with reference to the flowchart of FIG. 2 and the drawings associated therewith.

Figure 3:
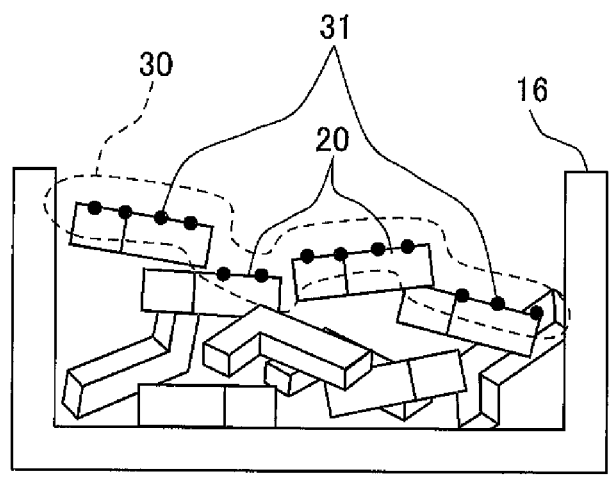
FIG. 3 is a view illustrating one example of a three-dimensional point set acquired using a three-dimensional measurement instrument of FIG. 1.

Processing of FIG. 2 is started when, for example, a pickup start command of an article 20 is input by operating an operation switch not illustrated. Initially, step S1 measures surfaces of a plurality of articles 20 randomly piled in a three-dimensional space using the three-dimensional measurement instrument 11 and then acquires a three-dimensional point set 30. FIG. 3 is a view illustrating one example of the three-dimensional point set 30 acquired using the three-dimensional measurement instrument 11 and three-dimensional points 31 configuring the three-dimensional point set 30. In the figure, the three-dimensional points 31 are illustrated with black circles and the three-dimensional point set 30 is illustrated as a region surrounded by a dotted line including all the black circles.

Figure 4:
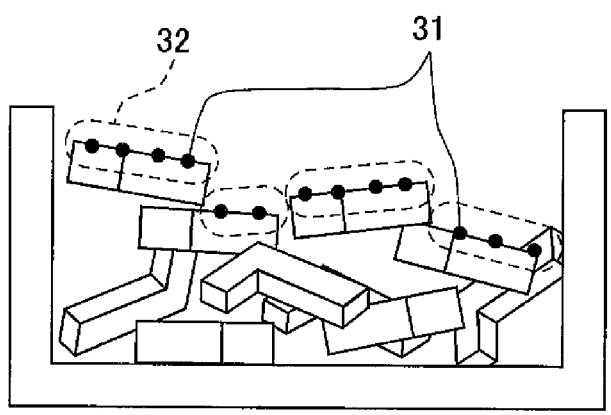
FIG. 4 is a view illustrating one example of a connected set determined from the three-dimensional point set of FIG. 3.

Then, step S2 determines at least one connected set 32 from the three-dimensional point set 30. FIG. 4 is a view illustrating one example of the connected set 32 determined from the three-dimensional point set 30. This figure illustrates the connected set 32 as a region surrounded by a dotted line. In other words, FIG. 4 illustrates four connected sets 32.

Figure 5:
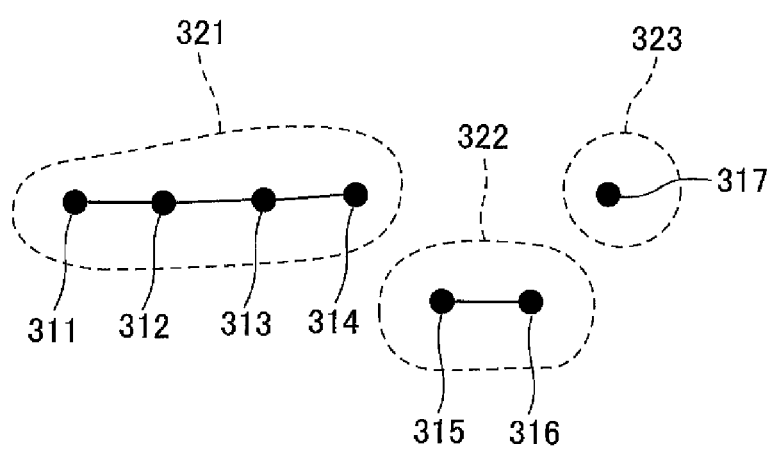
FIG. 5 is a conceptual view describing a connected set.

The connected set 32 referred to here is a partial set of the three-dimensional point set 30, and when in the vicinity of an arbitrary three-dimensional point (a first three-dimensional point) 31, another three-dimensional point (a second three-dimensional point) 31 different from the former three-dimensional point 31 is present, the connected set 32 refers to a set where the first three-dimensional point 31 and the second three-dimensional set 31 are connected. In other words, the connected set 32 refers to a set made by connecting three-dimensional points 31 present in the vicinity of each other. FIG. 5 is a view describing a concept of the connected set 32. In FIG. 5, when a distance between the first three-dimensional point 31 and the second three-dimensional point 31 next to each other falls within a predetermined value, the first three-dimensional point 31 and the second three-dimensional point 31 are connected with each other.

When as illustrated in FIG. 5, for example, a plurality of three-dimensional points 31 (expressed by 311 to 317) are measured using the three-dimensional measurement instrument 11 and of these, 311 and 312, 312 and 313, 313 and 314, and 315 and 316 are present within a predetermined distance, respectively, these points are connected with each other. In this case, 311 and 314 are also connected via 312 and 313 and therefore, 311 to 314 configure the same connected set 321. On the other hand, 315 and 316 are not connected with any one of 311 to 314 and therefore, configure another connected set 322. Since 317 is not connected with any one of 311 to 316, it singly configures a connected set 323.

When surfaces of articles 20 randomly piled is measured using the three-dimensional measurement instrument 11, three-dimensional points 31 (for example, 313 and 314 of FIG. 5) next to each other on the same article 20 are located close to each other. In contrast, in a boundary of articles 20, positions of three-dimensional points (for example, 314 and 315 of FIG. 5) next to each other are largely changed. Therefore, while the three-dimensional points 313 and 314 belong to the same connected set 32, the three-dimensional points 314 and 315 belong to connected sets 32 different from each other. Therefore, when a maximum distance between three-dimensional points configuring a connected set 32, a minimum number of points and a maximum number of points in the connected set 32, and others are appropriately set, the connected set 32 can be considered a surface shape of a single article 20. In other words, a single connected set 32 corresponds to a single article 20 on a one-to-one basis, and the article 20 can be identified using the connected set 32.

Figure 6:
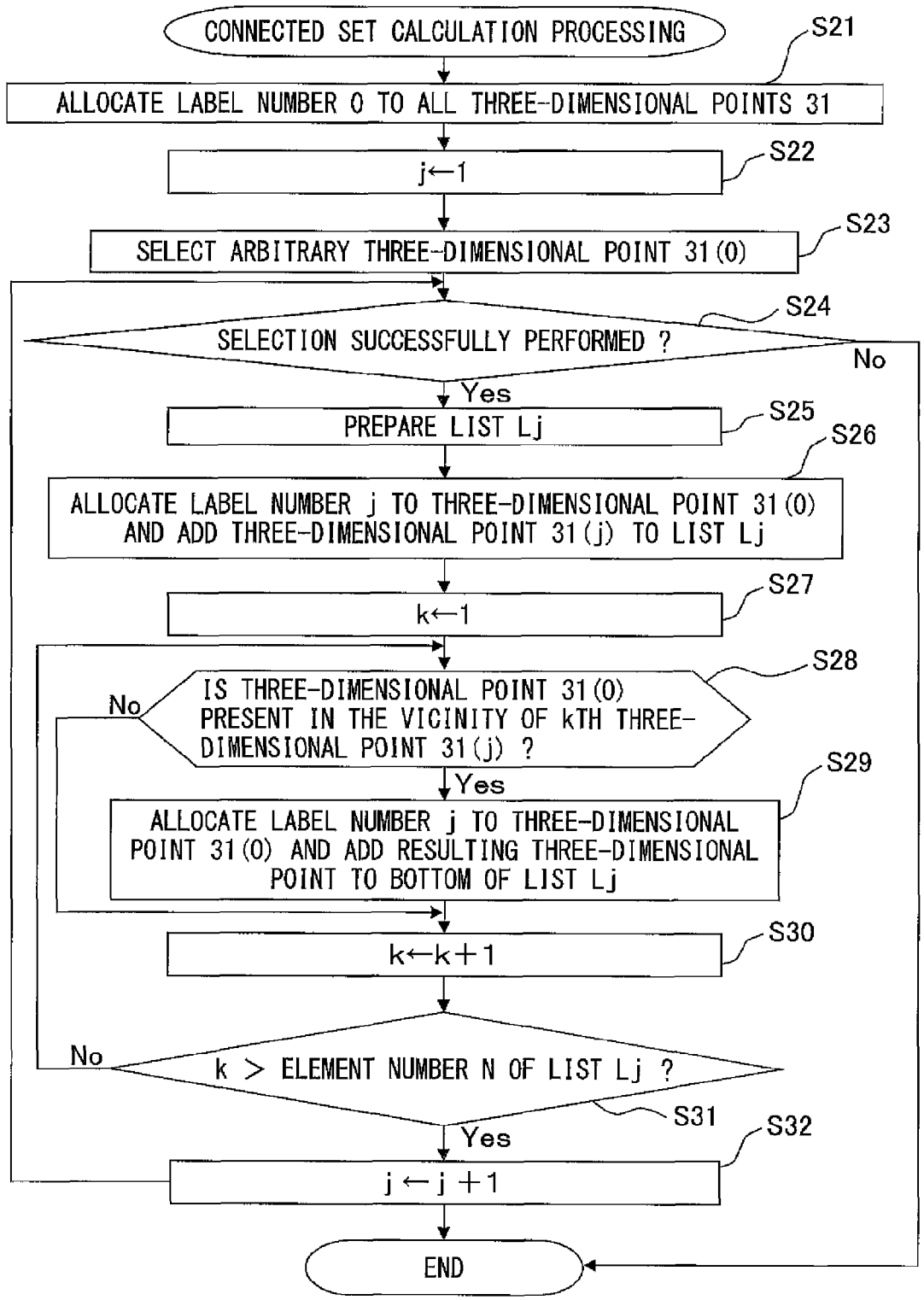
FIG. 6 is a flowchart illustrating details of processing for determining a connected set.

FIG. 6 is a flowchart illustrating processing (connected set calculation processing) for determining a connected set 32, i.e., a flowchart illustrating processing of step S2 of FIG. 2 in more detail. Initially, step S21 allocates a label number 0 indicating no belongingness to any connected set 32 to all the three-dimensional points 31 belonging to the three-dimensional point set 30 as an initial label number. In the following description, a three-dimensional point 31 allocated with a label number j which is a natural number is expressed using 31(j). The label number j is a number allocated corresponding to the connected set 32, and when the same label number j that is not 0 is allocated, belonging to the same connected set 32 is meant. Then, in step S22, to determine a first connect set 32, the label number j is set to be 1 (j←1).

Then, step S23 selects an arbitrary three-dimensional point 31(0) having a label number of 0 that is a three-dimensional point 31 belonging to the three-dimensional point set 30. Step S24 judges whether the three-dimensional point 31(0) having a label number of 0 has been selected, and when a judgment of Yes is made, the processing proceeds to step S25. When the three-dimensional point 31(0) has not been selected, all the three-dimensional points 31 belonging to the three-dimensional point set 30 belong to any one of the connected sets 32. In this case, a judgment of No is made in step S24 to end the connected set calculation processing and then the processing proceeds to step S3 of FIG. 2.

Step S25 prepares a list Lj for storing a three-dimensional point 31(j) having a label number of j. Step S26 allocates a label number j to the three-dimensional point 31(0) selected in step S24 and then adds the three-dimensional point 31(j) to the list Lj. In step S27, an initial value 1 is provided for a variable k having a natural number value (k←1). The variable k refers to a number specifying the three-dimensional point 31(j) included in the list Lj. It is assumed that in the list Lj, added three-dimensional points 31(j) are lined up in order of addition.

Step S28 judges whether in the vicinity of a kth three-dimensional point 31(j) of the list Lj, a three-dimensional point 31(0) having a label number of 0 is present. When a judgment of Yes is made in step S28, the processing proceeds to step S29, but when a judgment of No is made, the processing passes step S29 and then proceeds to step S30. Step S29 allocates a label number j to all the three-dimensional points 31(0) judged to be present in the vicinity of the kth three-dimensional point 31 (j) of the list Lj and thereafter, adds these three-dimensional points 31(j) to the bottom of the list Lj. Step S30 adds 1 to the variable k (k←k+1).

Step S31 judges whether a value of k is larger than the number (element number N) of three-dimensional points 31(j) stored in the list Lj. The case where k is larger than the element number N indicates that vicinity judgment processing for all N three-dimensional points 31(j) stored in the list Lj has been ended and three-dimensional points present in the vicinity of the three-dimensional points 31(j) in the list Lj have been already stored in the same list Lj. Therefore, processing for adding a three-dimensional point 31(j) to the list Lj is ended and then the processing proceeds to step S32. In cases other than the above case, vicinity judgment processing for all the three-dimensional points 31(j) in the list Lj has not been ended and therefore, the processing returns to step S28 to repeat processing for adding a three-dimensional point 31(j) to the list Lj.

Step S32 adds 1 to the label number j (j←j+1) and the processing returns to step S23. Thereafter, the same processing as step S23 to step S32 is repeated to determine a connected set 32 corresponding to the next label number j.

The connected set calculation processing described above will be specifically described with reference to FIG. 5. At the start of connected set calculation processing, any of the three-dimensional points 311 to 317 does not belong to the connected set 32 and then a label number for the three-dimensional points 311 to 317 is 0 (step S21). In order to prepare a connected set 32 having a label number of 1 from this state, when, for example, the three-dimensional point 313 is selected (step S23), the three-dimensional point 313 is allocated with a label number 1 (313(1)) and then the three-dimensional point 313 is stored as a first of a list L1 having a label number of 1 (step S26).

Then, it is judged whether the three-dimensional point 31(0) having a label number of 0 is present in the vicinity of the three-dimensional point 313 which is the first of the list L1 (step S28). In this case, the three-dimensional points 312 and 314 having a label number of 0 are present and therefore, these three-dimensional points 312 and 314 each are allocated with a label number 1 (312(1) and 314(1)) and are added as a second and a third of the list L1, respectively (step S29). Thereby, the element number N of the list L1 becomes 3.

Thereafter, the variable k becomes 2 (<N) (step S30) and then it is judged whether in the vicinity of the three-dimensional point 312 which is the second of the list L1, the three-dimensional point 31(0) of a label number of 0 is present (step S28). In this case, the three-dimensional point 311 of a label number of 0 is present and therefore, this three-dimensional point 311 is allocated with a label number 1 (311(1)) and then added as a fourth of the list L1 (step S29). Thereby, the element number N of the list L1 becomes 4.

Thereafter, the variable k becomes 3 (<N) (step S30) and then it is judged whether in the vicinity of the three-dimensional point 314 which is the third of the list L1, the three-dimensional point 31 of a label number of 0 is present (step S28). In this case, the three-dimensional point 31 of a label number of 0 is not present in the vicinity of the three-dimensional point 314 and therefore, the element number N remains as 4 and k becomes 4 (step S30). Then, it is judged whether in the vicinity of the three-dimensional point 311 that is the fourth of the list L1, the three-dimensional point 31(0) of a label number of 0 is present (step S28). In this case, the three-dimensional point 31 of a label number of 0 is not present in the vicinity of the three-dimensional point 311 and therefore, the element number N remains as 4 and k becomes 5 (step S30).

At that time, the variable k becomes larger than the element number N and therefore, preparation of the list L1 having a label number of 1 is ended and then the label number is set to be 2 (step S32) to repeat the same processing. In repetition processing, for example, three-dimensional points 315 and 316 having a label number of 0 are allocated with a label number 2, and three-dimensional points 315(2) and 316(2) are added to a list L2. Then, a three-dimensional point 317 having a label number of 0 is allocated with a label number 3 and a three-dimensional point 317(3) is added to a list L3. Thereby, the three-dimensional point 31 having a label number of 0 becomes absent and therefore, a judgment of No is made in step S24 and then connected set calculation processing is ended to proceed to step S3 of FIG. 2.

Figure 7:
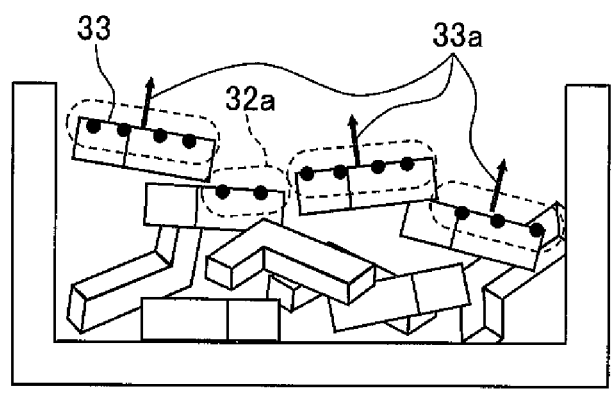
FIG. 7 is a view illustrating a plane where three-dimensional points belonging to a connected set are approximated and a normal vector on the plane.

Step S3 determines a plane 33 where three-dimensional points 31 are approximated, based on positions of the three-dimensional points 31 belonging to a connected set 32 with respect to the respective connected sets 32. The plane 33 is a plane extending over a range where three-dimensional points 31 exist, i.e., a finite plane. FIG. 7 is a view illustrating the plane 33 and a normal vector 33a extending vertically to the plane 33 from a point on the plane 33. The normal vector 33a can identify a posture of each plane 33. Assuming that three-dimensional points 31 are measured only on a single surface of each article 20, as illustrated in FIG. 7, the surface of the article 20 is considered to form the plane 33.

The plane 33 can be calculated, for example, by a least-squares method using all the three-dimensional points 31 included in a connected set 32. The plane 33 may be determined separately using outlier countermeasures of some sort. As a method for outlier countermeasures, several methods such as an M-estimation method, RANSAC, LMedS, and Hough transform are available. When processing such as Hough transform is introduced, one plane 33 can be extracted and recognized from a connected set 32 even when existing across surfaces of a plurality of articles 20. It is possible to remove a three-dimensional point 31 away from the plane 33 by at least a predetermined distance from a connected set 32 including the three-dimensional point 31 via the following processing.

Figure 8:
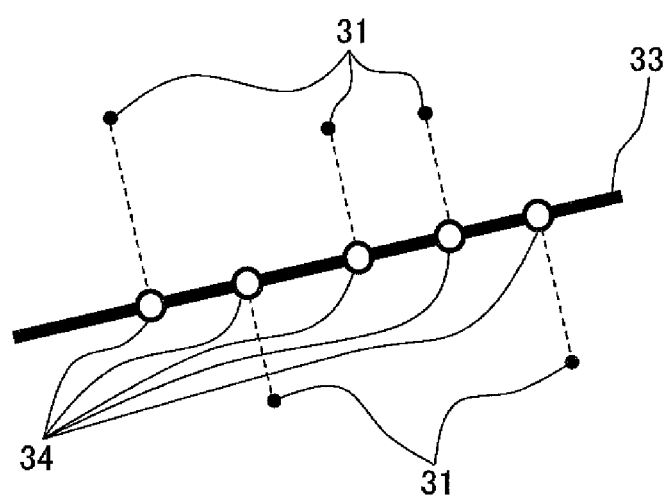
FIG. 8 is a view illustrating one example of a projection point where a three-dimensional point belonging to a connected set is orthogonally projected on a plane.

Step S4 calculates a position of a projection point 34 where a three-dimensional point 31 belonging to a connected set 32 is projected vertically to the plane 33 corresponding to the connected set 32. FIG. 8 is a view illustrating one example of the projection point 34 where a three-dimensional point 31 is orthogonally projected on the plane 33. FIG. 8 illustrates the projection point 34 using a white circle. It is possible that processing from step S4 is not executed for a connected set 32 (for example, 32a of FIG. 7) where the number of three-dimensional points 31 belonging to the connected set 32 is smaller than a predetermined value, i.e., an exposed area of the article 20 is smaller than a predetermined value but processing from step S4 is executed only when a surface of the article 20 is sufficiently exposed. Thereby, upon picking up the article 20, a possibility that the hand 14 fails to pick up the article 20 is reduced, and therefore the article pickup apparatus 10 can pick up the article 20 effectively.

Step S5 sets measurement points on each plane 33 over the entire range of the respective planes 33 and determines the number of projection points 34 located within a predetermined distance from each measurement point. The number corresponds to a density of projection points 34 in each measurement point, and step S5 calculates a density distribution of projection points 34 on the plane 33. The projection point 34 corresponds to the three-dimensional point 31 and therefore, a density distribution of projection points 34 can be considered a density distribution of three-dimensional points 31.

Figure 9:
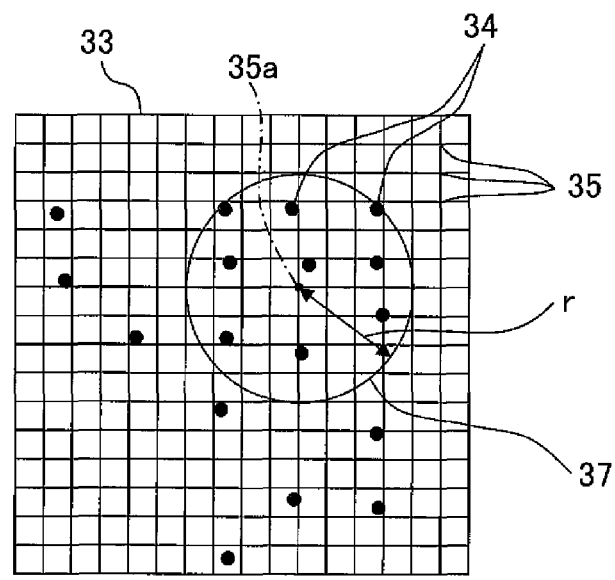
FIG. 9 is a view illustrating one example of a measurement point for determining a density of projection points.

FIG. 9 is a view illustrating one example of the measurement point 35 and the projection point 34. In FIG. 9, on the plane 33, the measurement point 35 is set in equal intervals in a lattice manner. In FIG. 9, the number of projection points 34 located within a predetermined distance r from a measurement point 35a, i.e., the number of projection points 34 included in a circle 37 of a radius r having the measurement point 35a as the center is nine. In this case, for example, a density in the projection point 35a is set to be 9. It is possible to set a value obtained by dividing the number of projection points 34 by an area of the circle 37 as the density. When such density calculation is performed for all the measurement points 35, a density distribution of projection points 34 on the plane 33 can be determined. It is possible that measurement points 35 are not set on the plane 33 in equal intervals but measurement points 35 are set on the respective projection points 34, for example. A density between the respective measurement points 35 can be determined, for example, via interpolation processing and thereby, a density distribution over the entire plane 33 can be determined.

Step S6 calculates a position (density local maximum position) of a point (density local maximum point) on the plane 33 where a density of projection points 34 is locally maximized, based on the density distribution calculated in step S5. The density distribution of projection points 34 corresponds to the density distribution of three-dimensional points 31 and therefore, the processing of step S6 is equivalent to the calculation of the density local maximum position where a density of three-dimensional points 31 is locally maximized. The density local maximum position can be determined by comparing the magnitudes of densities in a predetermined range on the plane 33 and calculating a position on the plane 33 where density is maximized. When a plurality of density local maximum points are determined on the plane 33, for example, a point having a larger density is selected to calculate a density local maximum position. The density local maximum position refers to a representative position representing a connected set 32.

Figure 10:
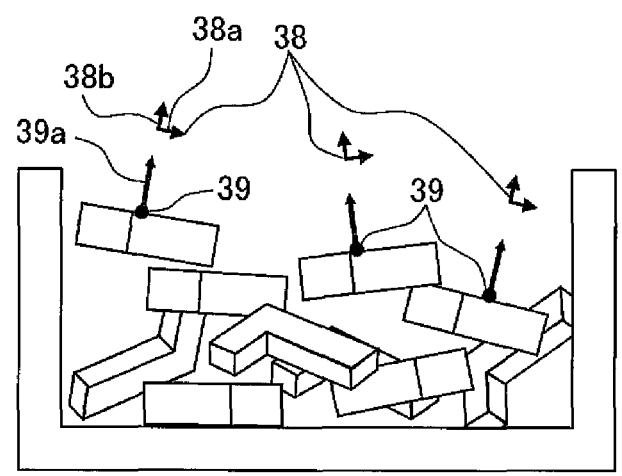
FIG. 10 is a view illustrating one example of a hand position posture corresponding to a density local maximum point.

FIG. 10 is a view illustrating one example of a density local maximum point 39. The density local maximum point 39 refers to a point where three-dimensional points 31 on a surface of the article 20 densely exist. Therefore, even when the article 20 has an L-letter shape or another complex shape or even when a hole is formed in a center (gravity center position) of the article 20, the density local maximum point 39 is always present on a surface where the article 20 is exposed. FIG. 10 illustrates a normal vector 39a to the plane 33 in the density local maximum point 39.

Step S7 calculates a position and a posture (a hand position posture 38) of the hand 14 capable of picking up an article 20 located in a density local maximum position. As illustrated in FIG. 10, the hand position posture 38 is expressed, for example, using a pair of arrows 38a and 38b intersecting at right angles. An intersection of the arrows 38a and 38b indicates a position of the hand position posture 38 and directions of the arrows 38a and 38b indicate a posture of the hand position posture 38. FIG. 10 illustrates the hand position posture 38 using two arrows 38a and 38b for convenience, but the hand position posture 38 is not present in a two-dimensional space but in a three-dimensional space, and therefore, actually expressed in a three-dimensional orthogonal coordinate system. Not limited to the orthogonal coordinate system, various coordinate systems may be used to express the hand position posture 38.

An intersection of a pair of arrows 38a and 38b is set at a position away from the density local maximum point 39 along the normal vector 39a by a predetermined distance (for example, Δd of FIG. 1). The arrow 38b is parallel to the normal vector 39a and the arrow 38a is parallel to the plane 33 determined by the three-dimensional point 31.

Figure 11:
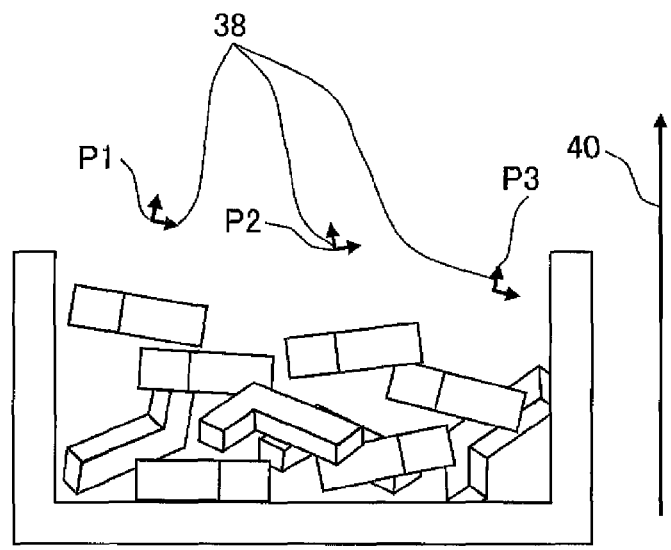
FIG. 11 is a view illustrating one example of numbering for the hand position posture of FIG. 10.

Step S8 numbers the respective hand position postures 38 as P1, P2, . . . , Pn. The letter n represents the number of hand position postures 38. FIG. 11 is a view illustrating the numbered hand position postures 38, and numbering is performed in descending order of a coordinate value with respect to a predetermined coordinate axis 40, i.e., in order from one located in a higher position (a larger z-coordinate). As the order of numbering, in addition to a descending order of a coordinate value, there is employable an order such as a descending order of an area of a plane where the connected set 32 is configured and the like determined by an arbitrary method based on an acquired three-dimensional point set. In FIG. 11, n=3.

In Step S9, an initial value is provided for a variable j having a natural number value. In other words, processing for j←1 is executed. The variable j is used to specify the number of the hand position posture 38.

Figure 12:
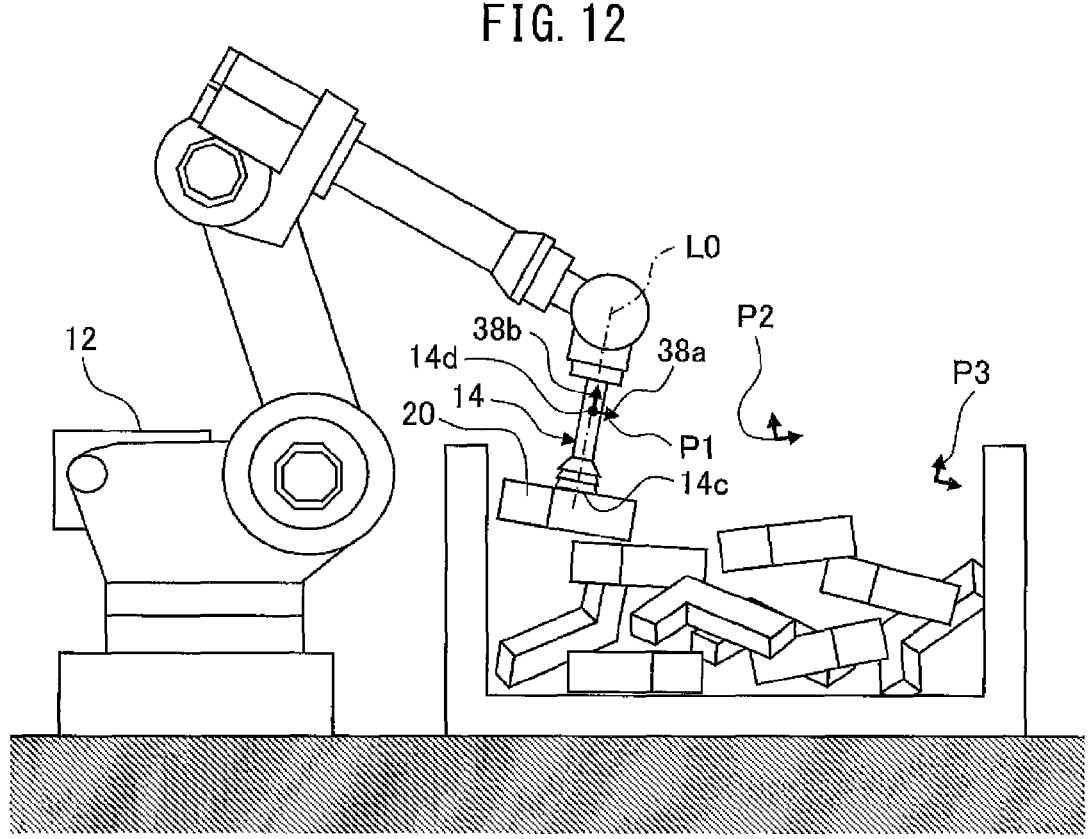
FIG. 12 is a view illustrating one example of an operation of an article pickup apparatus according to the embodiment of the present invention.

Step S10 outputs a control signal to a robot driving actuator (an electric motor) and moves the hand 14 to a hand position posture Pj (for example, P1) as illustrated in FIG. 12. In other words, the reference point 14d of the hand 14 is caused to accord with the intersection of the arrows 38a and 38b of the hand position posture P1 and the axis line L0 of the hand 14 is caused to accord with the arrow 38b. Thereby, the attracting face 14c of the hand 14 is disposed parallel to a surface of an article 20 to be picked up. The hand position posture Pj is obtained via numbering in descending order with respect to the predetermined coordinate axis 40 and therefore, the article 20 to be picked up becomes an article 20 located in the highest position in the container 16.

Step S11 outputs a control signal for holding the article 20 to a hand driving actuator. Thereby, the attracting face 14c of the hand 14 attracts and holds the article 20. The attracting face 14c is disposed opposite to a surface where the article 20 actually exists and therefore, the hand 14 can hold stably the article 20. In this case, when, for example, the hand 14 includes a suction nozzle, a vacuum pump is operated to suck and hold the article 20 by a suction force. When the hand 14 includes an attracting magnet, current is allowed to flow in an electromagnetic coil and the magnet is operated to attract and hold the article 20 by a magnetic force.

Figure 13:
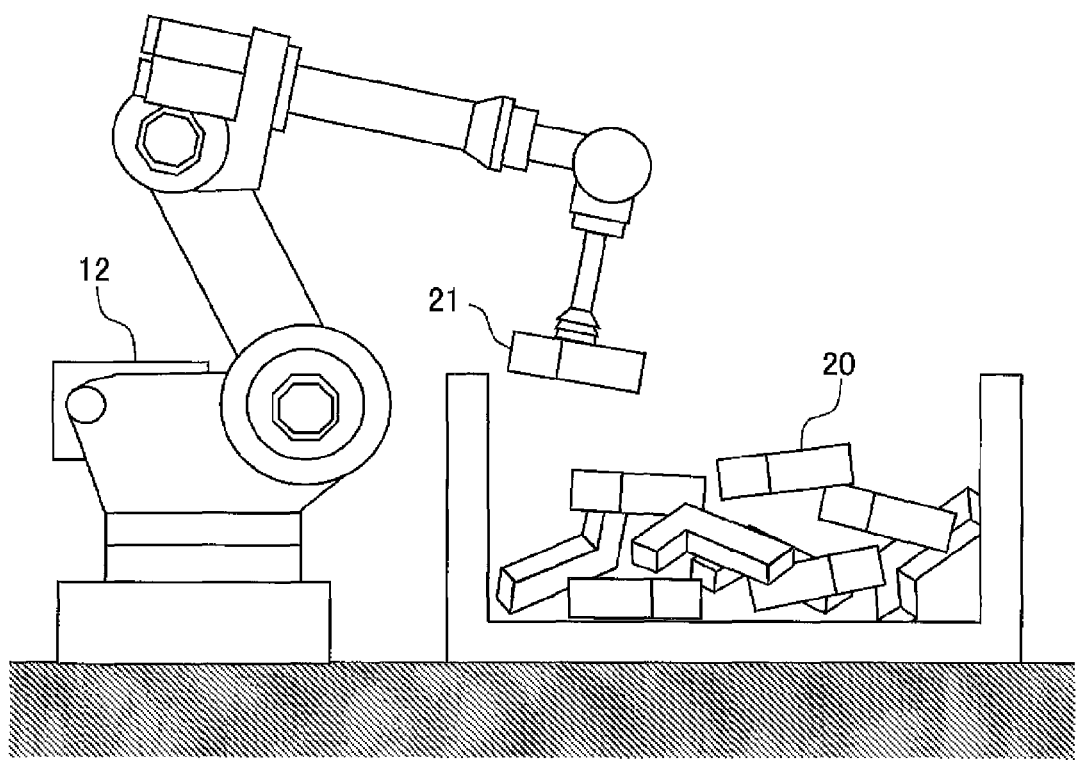
FIG. 13 is a view illustrating one example of an operation following the operation in FIG. 12.

Then, step S12 outputs a control signal to the robot driving actuator and raises the hand 14 holding an article 21 in a predetermined direction, for example, the predetermined coordinate axis 40 direction (FIG. 11) or the arrow 38b direction (FIG. 12) of the hand position posture 38, as illustrated in FIG. 13. When the hand 14 is raised in the predetermined direction, a collision between the hand 14 or the article 21 and another article 20 is avoidable upon moving the hand 14 by an operation of the robot 12.

Step S13 judges whether the hand 14 has succeeded in holding the article 21. When, for example, the hand 14 includes a weight detector for detecting weight and a detected value is at least a predetermined value, it is judged that a hold has been successfully performed. When the hand 14 includes an attracting magnet, it is possible to judge whether the article 21 exists using a proximity sensor and to judge whether a hold has been successfully performed according to the judgment result. When the hand 14 includes a suction nozzle, it is possible to judge whether a hold has been successfully performed according to a change of a flow rate or a pressure of air during suction. When it is judged that the hold has been successfully performed, the processing proceeds to step S14. When it is judged that the hold has not been successfully performed, the processing proceeds to step S15.

Figure 14:
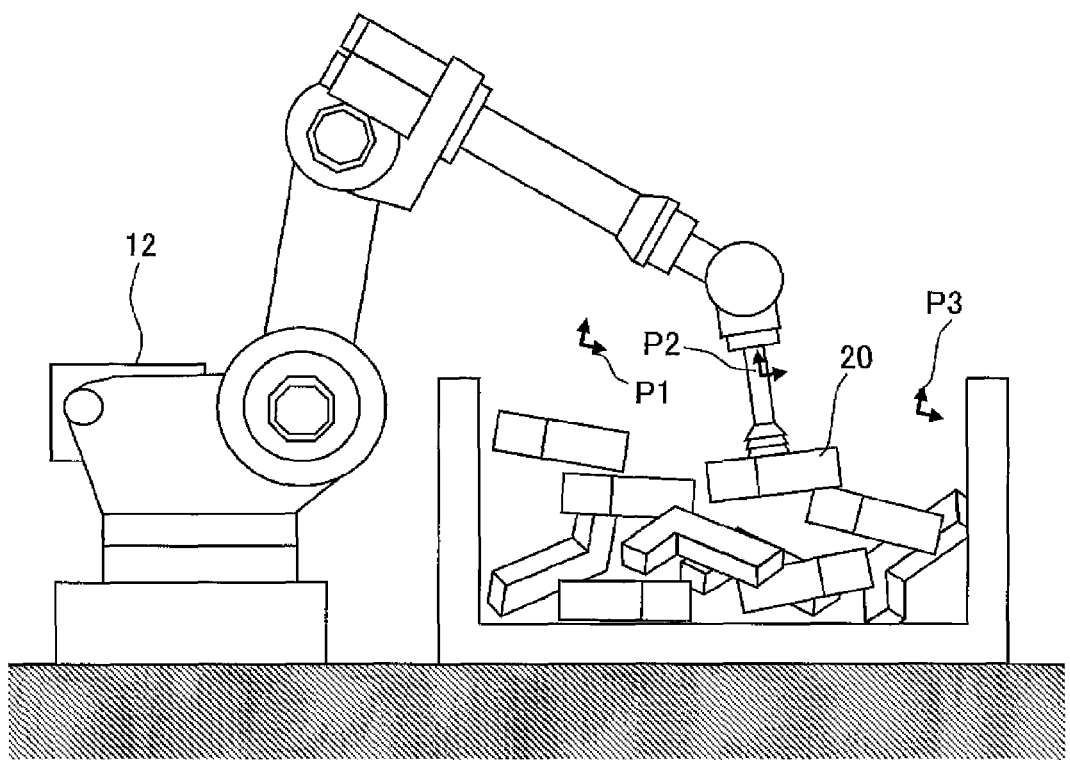
FIG. 14 is a view illustrating one example of an operation following the operation in FIG. 13.

Step S15 judges whether j<n. This judgment is a judgment whether any hand position posture the hand 14 has not reached yet exists among n (3 in FIG. 12) hand position postures 38. When j<n is judged, the hand 14 has not reached yet a hand position posture Pj+1 and therefore, processing for j←j+1 is executed in step S16 and then the processing returns to step S10. Then, as illustrated in FIG. 14, an operation of the robot 12 moves the hand 14 to the next hand position posture Pj (for example, P2). Then, a control signal for holding the article 20 is output to the hand driving actuator to hold an article 21 (step S11). When step S15 judges that j≥n, the hand 14 has reached all n hand position postures 38 and therefore, the processing proceeds to step S14.

Step S14 outputs a control signal to the robot driving actuator to convey the article 21 to a predetermined position by an operation of the robot 12 and removes the article 21 from the hand 14. This indicates the end of one cycle of the processing.

The present embodiment makes it possible to achieve the following operations and effects.

(1) In the present embodiment, surface positions of a plurality of articles 20 randomly piled in a three-dimensional space are measured using the three-dimensional measurement instrument 11 and position information of a plurality of three-dimensional points 31 are acquired (step S1); a density distribution indicating a degree of a distribution of the three-dimensional points 31 in the three-dimensional space is calculated based on the measured position information of the three-dimensional points 31 (step S5); a density local maximum position where density is locally maximized is calculated based on the calculated density distribution (step S6); on the basis of this density local maximum position, a hand position posture 38 capable of picking up an article 20 located in the density local maximum position is calculated (step S7); and the robot 12 is controlled to pick up the article 20 by moving the hand 14 to the hand position posture 38 (step S10 to step S12).

This makes it possible to identify a position and a posture of the article 20 without pattern matching or the like. Therefore, any model pattern of the article 20 need not be prepared, and it is possible to easily recognize positions and postures of a large number of types of articles or indefinitely shaped articles 20 to hold the articles 20. Further, it is also possible to recognize a position and a posture of a new type of article 20 added, without addition of a model pattern therefor. Therefore, it is possible to avoid problems such as a recognition failure of the article 20, a recognition error of a position posture of the article 20, a pickup failure of the article 20, and a collision to effectively pick up the article 20 by quickly moving the hand 14 to an article 20 to be easily picked up located on an upper side. Further, since the hand position posture 38 is calculated based on a density local maximum position where a density of three-dimensional points 31 is high, the hand 14 can be assuredly brought into contact with a surface of the article 20. Therefore, even in the case where a gravity center of the connected set 32 is not located on a surface of the article 20 such as cases where the article 20 has an L-letter shape and a hole is formed in the center of the article 20, the article 20 can be stably held.

(2) A plane 33 where a plurality of three-dimensional points 31 acquired using the three-dimensional measurement instrument 11 are approximated is calculated (step S3); positions of projection points 34 where the plurality of the three-dimensional points 31 are projected on the plane 33 are calculated (step S4); and the number of projection points 34 located within a predetermined distance r from a density measurement point 35 on the plane 33 is determined and a density of projection points 34 in the density measurement point 35 is determined according to this number to calculate a density distribution (step S5). When three-dimensional points 31 are projected on the plane 33 in this manner, a location where density is locally maximized becomes present on a surface of the article 20. Therefore, the hand 14 can successfully attract the surface of the article 20, resulting in enhanced reliability of article pickup using the article pickup apparatus 10. In contrast, when an approximate plane 33 is not used, there may exist a location where, for example, density is locally maximized in a corner of the article 20. In this case, it is difficult that the hand 14 attracts the corner of the article 20.

(3) Connected sets 32 made by connecting three-dimensional point 31 present in the vicinity of each other are configured among a plurality of three-dimensional points 31 (step S2); a density distribution is calculated with respect to each connected set 32 using three-dimensional points 31 included in each connected set 32 (step S5); and a density local maximum position is determined (step S6). Since the connect set 32 is a set of three-dimensional points 31 corresponding to each article 20, a density local maximum position can be determined with respect to each article 20, and therefore, the hand 14 can hold a plurality of article 20 different in posture from each other.

(4) The connected set 32 is configured by three-dimensional points 31 in a region on the plane 33 including a density local maximum position; on the basis of position information of three-dimensional points 31 included in the connected set 32, a position representing the connected set 32 corresponding to each article 20, i.e., a density local maximum position is calculated; and on the basis of this representative position (density local maximum position) and position information of three-dimensional points 31 around the representative position (for example, position information of three-dimensional points 31 configuring the plane 33), a hand position posture 38 (a position of an intersection of the arrows 38a and 38b of FIG. 12 and directions of the arrows 38a and 38b) is calculated (step S7). Thereby, the hand position posture 38 is calculated for each article 20 and therefore, individual articles 20 can be stably held.

Figure 15:
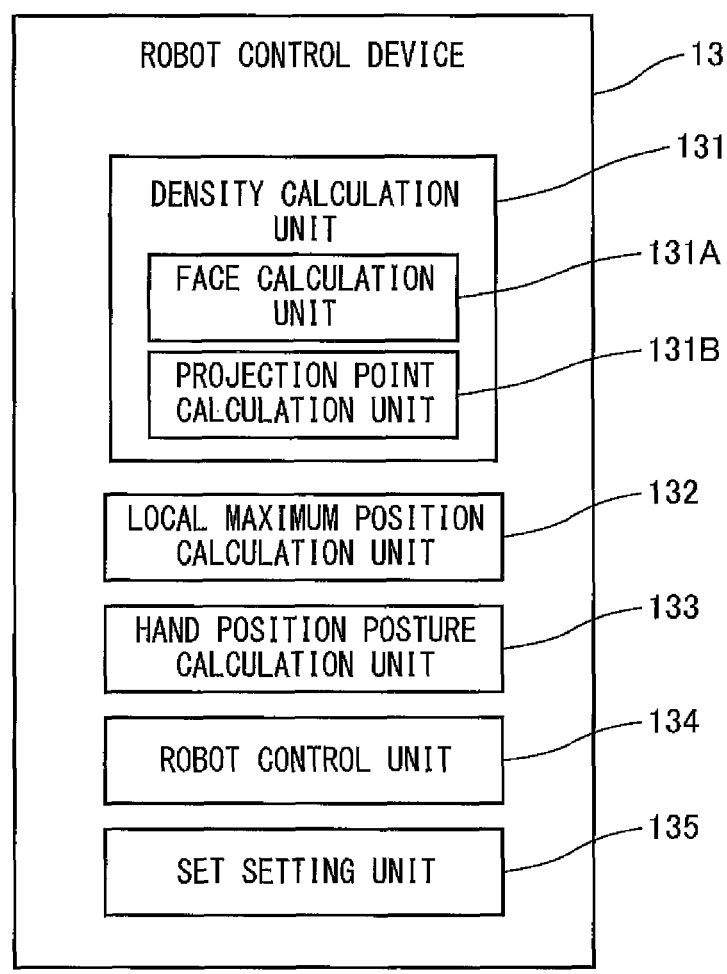
FIG. 15 is a block diagram illustrating an internal configuration of the robot control device of FIG. 1.

FIG. 15 is a block diagram illustrating an internal configuration of the robot control device 13 of FIG. 1. The robot control device 13 includes a density calculation unit 131, a local maximum position calculation unit 132, a hand position posture calculation unit 133, a robot control unit 134, and a set setting unit 135. The density calculation unit 131 includes a face calculation unit 131A and a projection point calculation unit 131B.

In the embodiment described above, a plurality of three-dimensional points 31 acquired using the three-dimensional measurement instrument 11 are approximated on the plane 33 (step S3), but the approximation may be made on a curved surface and a configuration of the face calculation unit 131A is not limited to the configuration described above. Therefore, instead of projecting a plurality of three-dimensional points 31 on the plane 33, step S4 may project a plurality of three-dimensional points 31 on a curved surface and a configuration of the projection point calculation unit 131B for calculating a position of the projection point 34 is not limited to the configuration described above, either. In the embodiment described above, the number of projection points 34 located within a predetermined distance r from a density measurement point 35 on the plane 33 is determined and a density of projection points 34 in the density measurement point 35 is determined according to this number to calculate a density distribution of the projection points 34 using this density (step S5), but a density distribution indicating a degree of a distribution of a plurality of three-dimensional points 31 in a three-dimensional space may be calculated without projecting the three-dimensional points 31 on a flat surface or a curved surface. When the density distribution is calculated based on position information measured using the three-dimensional measurement instrument 11, the density calculation unit 131 may be configured in any manner.

In the embodiment described above, a density local maximum position where a density of projection points 34 is locally maximized is calculated based on a density distribution of the projection points 34 (step S6), but a density local maximum position where a density of three-dimensional points 31 is locally maximized may be calculated based on a density distribution of the three-dimensional points 31 without use of projection points 34 and a configuration of the local maximum position calculation unit 132 is not limited to the configuration described above.

In the embodiment described above, a position of the hand position posture 38 is set in a point away from a density local maximum point 39 along a normal vector 39a of the plane 33 by a predetermined amount and a posture of the hand position posture 38 is set in directions (arrows 38a and 38b) parallel to the plane 33 and the normal vector 39a, respectively (FIG. 10), but when the hand position posture 38 is set based on a density local maximum position calculated using the local maximum position calculation unit 132, the hand position posture 38 may be set as a position and a posture different from the above-described ones and a configuration of the hand position posture calculation unit 133 is not limited to the configuration described above. In the embodiment described above, a position posture of the hand 14 capable of picking up an article 20 located in a density local maximum position is set as the hand position posture 38, but a position posture capable of picking up an article 20 located in the vicinity of the density local maximum position may be set as the hand position posture 38.

In the embodiment described above, the robot 12 is controlled to cause the axis line L0 and the reference point 14d of the hand 14 to accord with the hand position posture 38 (step S10), but when the robot 12 is controlled to pick up the article 20 by moving the hand 14 to the hand position posture 38 calculated using the hand position posture calculation unit 133, the robot control unit 134 may be configured in any manner. The hand 14 is appropriately modified according to a shape of the article 20, and the present invention is applicable to articles 20 of various shapes other than the above-described ones.

In the embodiment described above, a connected set 32 made by connecting three-dimensional points 31 present in the vicinity of each other is set among a plurality of three-dimensional points 31 (step S2). This connected set 32 is equivalent to a set including three-dimensional points 31 in a region including a density local maximum position calculated using the local maximum position calculation unit 132, i.e., a closed region on a surface of a single article 32, but a set including three-dimensional points 31 present in the vicinity of each other may be one other than the connected set 32 and a configuration of the set setting unit 135 is not limited to the configuration described above.

An article pickup method for picking up a plurality of articles 20 randomly piled in a three-dimensional space may be configured in any manner when the following is satisfied: surface positions of a plurality of articles 20 randomly piled are measured using the three-dimensional measurement instrument 11 so as to acquire position information of a plurality of three-dimensional points 31; a density distribution indicating a degree of a distribution of a plurality of three-dimensional points 31 in a three-dimensional space is calculated based on the position information measured using the three-dimensional measurement instrument 11; a density local maximum position where density is locally maximized is calculated based on the calculated density distribution; a hand position posture 38 which is a position and a posture of the hand 14 capable of picking up an article 20 located in a density local maximum position or a vicinity thereof is calculated based on the calculated density local maximum position; and the robot 12 is controlled to pick up the article 20 by moving the hand 14 to the calculated hand position posture 38.

It is possible to arbitrarily combine the embodiment described above with one modified example or a plurality of modified examples.

According to the present invention, a density distribution indicating a degree of a distribution of three-dimensional points is calculated from position information of a plurality of three-dimensional points on an article surface acquired using a three-dimensional point measurement instrument and then a position posture of a hand is controlled based on a density local maximum position where density is locally maximized. Therefore, it is possible to recognize a position and a posture of an article without preparing a model pattern for the article, and even regarding a large number of types of articles and indefinitely shapes articles, it is possible to easily recognize positions and postures thereof and hold the articles. A density local maximum position is present on a surface of an article and therefore, the hand can be assuredly brought into contact with a surface of the article, resulting in enhanced reliability of an article pickup operation.

The present invention has been described in association with the preferred embodiment, but it should be understood by those skilled in the art that various modifications and conversions may be made without departing from the disclosed scope of the claims to be described later.

The invention claimed is:

1. An article pickup apparatus comprising:
    a robot including a hand capable of holding an article;
    a three-dimensional measurement instrument measuring surface positions of a plurality of articles randomly piled on a three-dimensional space to acquire position information of a plurality of three-dimensional points;
    a density calculation unit calculating a density distribution indicating a degree of a distribution of the plurality of three-dimensional points in the three-dimensional space, based on the position information measured by the three-dimensional measurement instrument;
    a local maximum position calculation unit calculating a density local maximum position where a density is locally maximized, based on the density distribution calculated by the density calculation unit;
    a hand position posture calculation unit calculating a hand position posture based on the density local maximum position calculated by the local maximum position calculation unit, the hand position posture being a position and a posture of the hand capable of picking up an article at the density local maximum position or in the vicinity of the density local maximum position; and
    a robot control unit controlling the robot so as to move the hand to the hand position posture calculated by the hand position posture calculation unit to pick up the article.

2. The article pickup apparatus according to claim 1, wherein
    the density calculation unit includes:
        a face calculation unit calculating a plane or a curved surface approximating the plurality of three-dimensional points acquired by the three-dimensional measurement instrument; and
        a projection point calculation unit calculating positions of projection points obtained by projecting the plurality of three-dimensional points onto the plane or the curved surface calculated by the face calculation unit,
    wherein the density calculation unit determines a number of the projection points located within a predetermined distance from a density measurement point on the plane or the curved surface, determines a density of the projection points in the density measurement point according to the number of the projection points, and calculates the density distribution using the density of the projection points.

3. The article pickup apparatus according to claim 1, further comprising
a set setting unit setting sets composed of the three-dimensional points present in the vicinity of each other among the plurality of three-dimensional points, wherein
the density calculation unit calculates the density distribution for each of the sets using the three-dimensional points included in the set, and
the local maximum position calculation unit calculates the density local maximum position for each of the sets.

4. The article pickup apparatus according to claim 3, wherein
the sets are connected sets made by connecting the three-dimensional points present in the vicinity of each other among the plurality of three-dimensional points.

5. The article pickup apparatus according to claim 1, further comprising
a set setting unit setting a set composed of the three-dimensional points in a region including the density local maximum position calculated by the local maximum position calculation unit, wherein
the density calculation unit calculates a representative position representing the set, based on position information of the three-dimensional points included in the set, and
the hand position posture calculation unit calculates the hand position posture based on the representative position calculated by the density calculation unit and position information of three-dimensional points around the representative position.

6. An article pickup method for picking up a plurality of articles randomly piled on a three-dimensional space using a robot including a hand capable of holding an article, the method comprising:
measuring surface positions of the plurality of articles randomly piled by a three-dimensional measurement instrument to acquire position information of a plurality of three-dimensional points;
calculating a density distribution indicating a degree of a distribution of the plurality of three-dimensional points in the three-dimensional space, based on the position information measured by the three-dimensional measurement instrument;
calculating a density local maximum position where a density is locally maximized, based on the density distribution calculated;
calculating a hand position posture based on the density local maximum position calculated, the hand position posture being a position and a posture of the hand capable of picking up an article at the density local maximum position or in the vicinity of the density local maximum position; and
controlling the robot so as to move the hand to the hand position posture calculated to pick up the article.

* * * * *